(No Model.)  2 Sheets—Sheet 1.
J. RANDALL.
HYDROSTATIC VEHICLE SPRING.
No. 443,112. Patented Dec. 23, 1890.
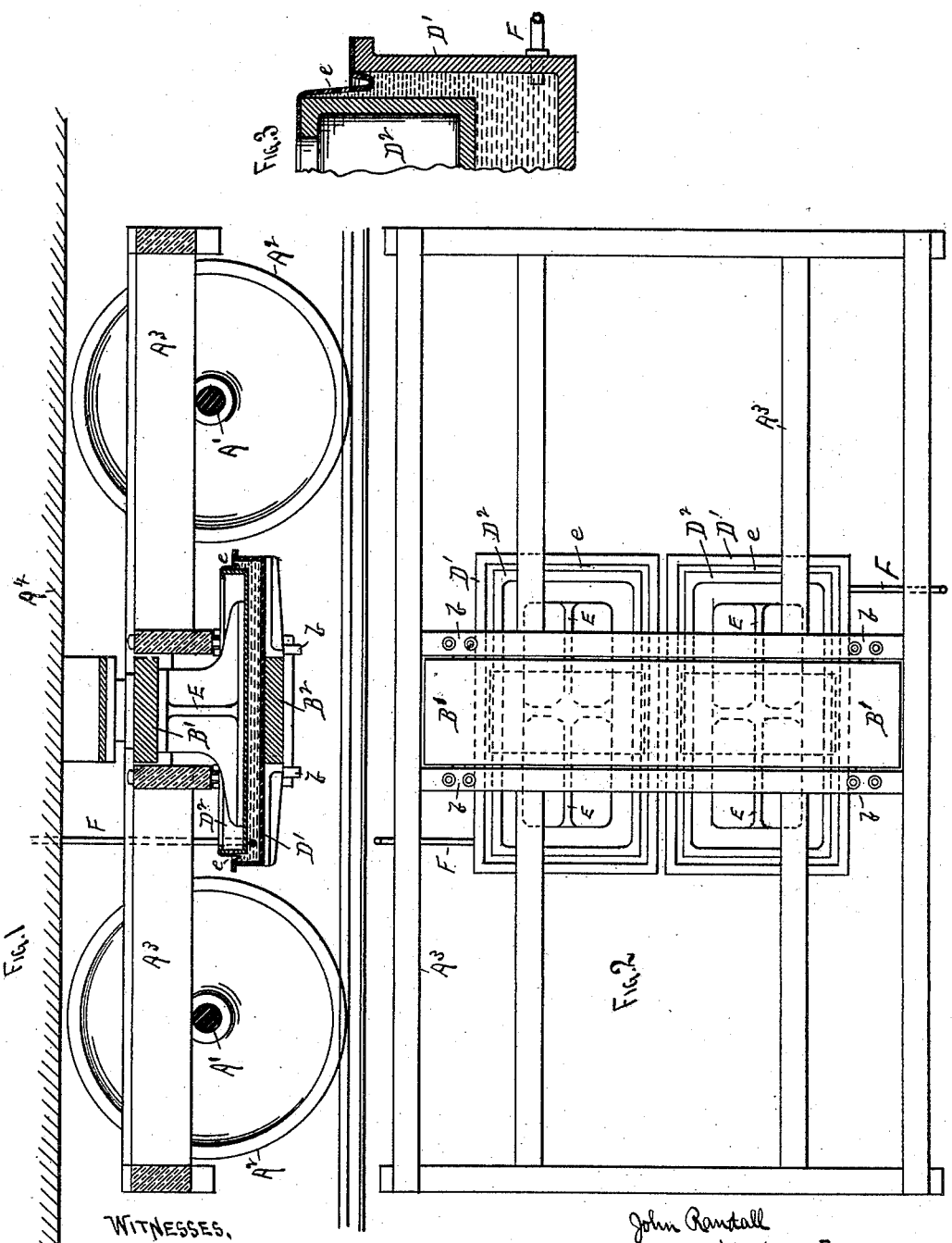

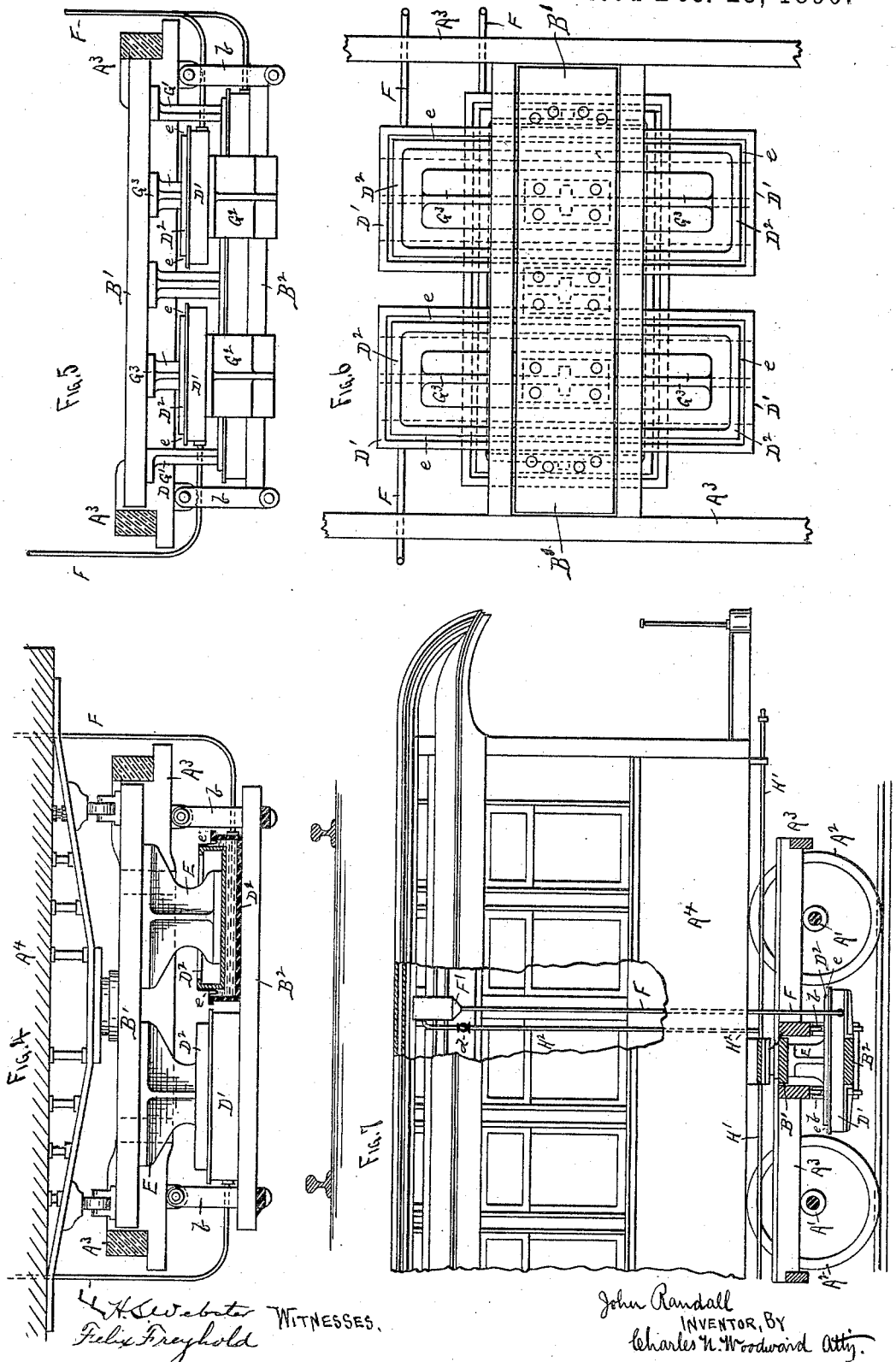

UNITED STATES PATENT OFFICE.

JOHN RANDALL, OF CHIPPEWA FALLS, WISCONSIN.

HYDROSTATIC VEHICLE-SPRING.

SPECIFICATION forming part of Letters Patent No. 443,112, dated December 23, 1890.

Application filed October 22, 1889. Serial No. 327,835. (No model.)

*To all whom it may concern:*

Be it known that I, JOHN RANDALL, a citizen of the United States, residing at Chippewa Falls, in the county of Chippewa and State of Wisconsin, have invented certain new and useful Improvements in Hydrostatic Springs for Vehicles, of which the following is a specification.

This invention relates to the springs or cushions for the supports of vehicles; and it consists in fluid cushions or springs interposed between the body and running-gear, whereby the motion is modulated and the jarring and shaking absorbed by the liquid cushion, so as to prevent its being communicated to the body of the vehicle or its contents, as hereinafter shown and described, and specifically pointed out in the claims.

The fluid will be confined in a casing or tank formed in two fluid-tight parts and connected by a flexible fluid-tight joint, the running-gear being connected to one casing and the body of the vehicle connected to the other, and with an upright pipe connected to the fluid within the casing and extending upward a sufficient distance to produce the requisite pressure to overcome the weight of the body of the vehicle and its contents and thereby "balance" it.

This invention may be applied to any form of vehicle, such as ordinary carriages or wagons, street-cars, railway-cars, either passenger or freight, or to any other form of vehicle; but for the purpose of illustration I have shown it applied to a truck of a railway-passenger-coach of the ordinary construction, in which—

Figure 1 is a sectional side elevation, and Fig. 2 is a plan view, of a portion of one of the trucks of a railway passenger-coach with a set of my improved springs arranged thereon. Fig. 3 is an enlarged sectional detail illustrating more fully the construction of one of the fluid-tanks and the flexible joint between its parts. Fig. 4 is a sectional end view of the truck and a portion of the body of the coach, as shown in Fig. 1. Figs. 5 and 6 are views similar to Figs. 2 and 4, illustrating a slight modification in the construction. Fig. 7 is a side view, partially in section on a reduced scale, of a portion of a railway-coach and one of its trucks, illustrating the manner in which the stand-pipe is applied to the hydrostatic springs.

$A'$ represents the axles; $A^2$, the flanged wheels; $A^3$, the truck-frame; $A^4$, the body of the coach; $B'$, the upper spring supporting-plate, connected by the swivel-connection $a$ to the coach, and $B^2$ the lower spring supporting-plate, connected to the truck-frame by suspension rods or bars $b$. This shows a form of construction in common use on railroads, and is employed to show how my invention may be arranged on the trucks in use and without altering any of the parts. The ordinary springs for supporting the coach-body are connected to the plates $B'$ $B^2$, and I simply remove these springs and replace them with my invention. The fluid-tanks may be made of any suitable size or form, according to their location and the strains to which they are to be subjected or the loads they are to support; but for the purpose of illustration I have shown them in Figs. 1, 2, 4, and 7 formed in two sections, $D'$ representing the lower parts and $D^2$ the upper parts, the two parts of each section being connected by flexible joints $e$, of rubber or other similar suitable material of sufficient strength to withstand the pressure and other strains to which they will be subjected. The upper part $D^2$ is formed hollow and fits into the lower part $D'$, as shown more clearly in Fig. 3, the space between them being filled with any suitable fluid. The parts $D'$ rest upon the lower spring-plate $B^2$, and the part $D^2$ is connected to the spring-plate $B'$ by brackets or standards E. The parts $D'$ $D^2$ will be of iron or steel of sufficient strength to withstand the pressure to which they will be subjected, and all the parts will be necessarily very strong and firmly secured together to enable them to withstand the severe strains to which the trucks are subjected.

I do not wish to be limited to any particular form of the parts or to the manner of connecting or securing them, as I am aware that many modifications thereof might be employed.

Connected into each of the parts $D'$ is a tube F, which is extended upward as high as the roof of the coach will permit, the amount of the load which the fluid in the tanks $D'$ $D^2$ will support being thereby multiplied by the height of these tubes F, on the principle of the well-known law of hydrostatics governing the pressure of fluids.

Experiments have shown that there is ample space within the frame-work of ordinary car-trucks to support tanks of sufficient capacity to sustain a weight of nearly forty thousand pounds upon each truck, which is largely in excess of what they will ever be required to support.

This device forms a very flexible and yielding cushion or spring, into which the jar and movement of the trucks is absorbed, so that it is not communicated to the body of the vehicle, the latter, therefore, being free from sudden oscillation or other unpleasant movement, the motion being modulated and uniform and perfectly noiseless. Under some circumstances the tanks may be formed the entire length of the vehicle or divided into as many smaller tanks as required. It will also be found very useful when applied to freight-cars for the transportation of fragile goods.

In Figs. 5 and 6 I have shown the tanks arranged in series, one set above the other, thereby doubling their capacity. In this construction I have shown the lower part D' in the form of a long tank resting upon the lower spring-plate B² and with its part D² connected by standards G' to the upper spring-plate B', and two of the parts D' made smaller and supported across the parts of the longer tank upon the lower plate B² by brackets G², and with the parts D² connected to the upper spring-plate B' by standards G³, the two sets of tanks being thus entirely independent, but uniting to support the vehicle body resting upon the plate B'.

Each of the tanks has its own independent tube F running upward to the top of the coach, so that each tank supports its own individual load. By this simple arrangement the capacity of the tanks may be multiplied to any required extent.

The fluid used may be of any required kind, either water, oil, alcohol, or other substance, but should be of some substance which will not congeal in cold weather or ignite in event of any accident to the vehicle.

The flexible connection b must be of sufficient strength to withstand the pressure and sufficiently flexible to permit the requisite movement between the parts.

Having thus described my invention, what I claim as new is—

1. A spring for vehicles, consisting of one or more casings or tanks formed in two or more parts flexibly connected and filled with liquid and interposed between the running-gear and the body of the vehicle, and a substantially upright tube connected into said casing or tank and of a length sufficient to cause the pressure of the liquid in said casing or tank to correspond to the load required to be borne by the vehicle, substantially as and for the purpose set forth.

2. A spring for vehicles, consisting of a tank or casing formed in two or more parts D' D², connected by flexible joint b, and filled with liquid, said part or parts D' connected to the running-gear of the vehicle and said part or parts D² connected to the body of the vehicle, and one or more substantially upright tubes F, connected into said casing or tank and of a length sufficient to cause the pressure of the liquid in said casing or tank to correspond to the load required to be borne by the vehicle, substantially as and for the purpose set forth.

In testimony whereof I have hereunto set my hand in the presence of two subscribing witnesses.

JOHN RANDALL.

Witnesses:
C. N. WOODWARD,
D. M. McCRANEY.